United States Patent [19]

Heijst

[11] 3,841,501
[45] Oct. 15, 1974

[54] SHIP LOADING AND UNLOADING EQUIPMENT

[75] Inventor: Willem Jan Van Heijst, Monte Carlo, Monaco

[73] Assignee: N.V. Industrieele Handelscombinatie Holland, Rotterdam, Netherlands

[22] Filed: Nov. 17, 1972

[21] Appl. No.: 307,347

[30] Foreign Application Priority Data
Nov. 18, 1971 Netherlands...................... 71.15916

[52] U.S. Cl........................ 214/13, 114/43.5, 212/3
[51] Int. Cl............................................ B65g 67/58
[58] Field of Search......... 214/12, 13, 14; 114/43.5, 114/45, 46; 212/3

[56] References Cited
UNITED STATES PATENTS

| | | | |
|---|---|---|---|
| 717,356 | 12/1902 | Cunningham..................... | 214/13 X |
| 738,084 | 9/1903 | Titcomb............................... | 214/13 |
| 1,292,852 | 1/1919 | Musker................................ | 214/13 |
| 1,300,954 | 4/1919 | Gray..................................... | 114/45 X |
| 3,104,766 | 9/1963 | Sasadi.................................. | 214/14 |

*Primary Examiner*—Frank E. Werner
*Attorney, Agent, or Firm*—Young and Thompson

[57] ABSTRACT

Loading and unloading equipment for vessels carrying bulk materials, comprises a buoyant body having bulk material handling apparatus thereon. The body has an upright portion that carries the material handling and a horizontal portion that is movable laterally relative to the vessel to be loaded or unloaded. The buoyancy of the body is regulable to permit insertion of the horizontal portion laterally beneath the vessel when the body has relatively low buoyancy, after which the buoyancy of the body is increased to engage the horizontal portion beneath the vessel. The horizontal and upright portions have antifriction roller means so that the body can move lengthwise of the vessel. Another horizontal portion, for servicing a second vessel, can be disposed on the side of the upright portion opposite the first horizontal portion.

7 Claims, 5 Drawing Figures

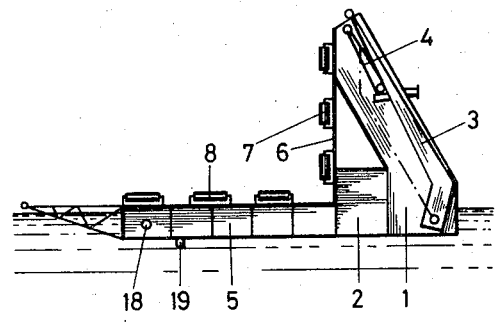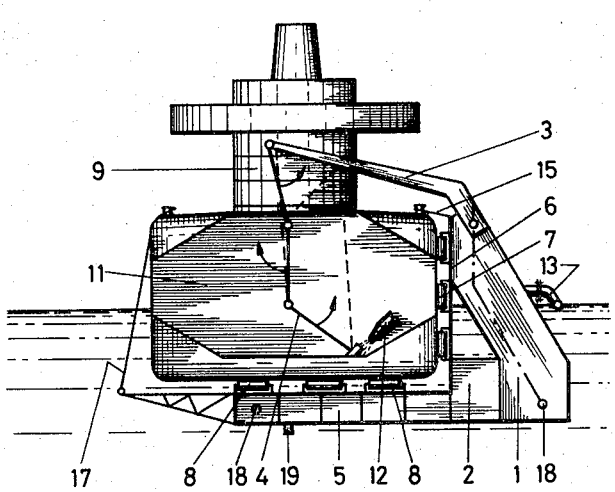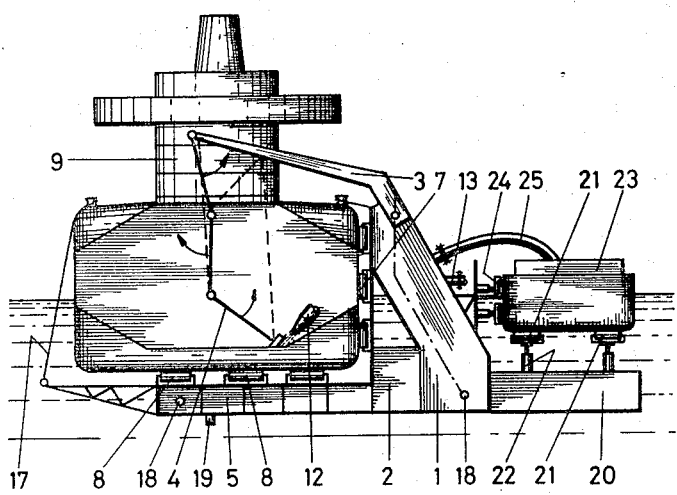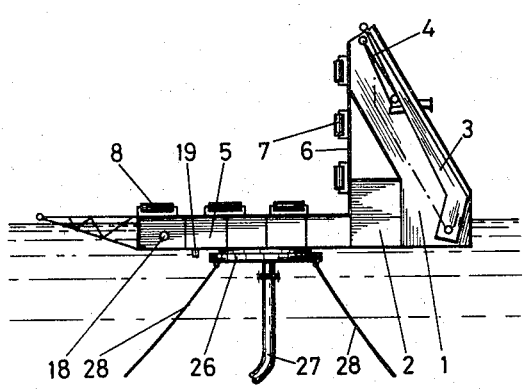

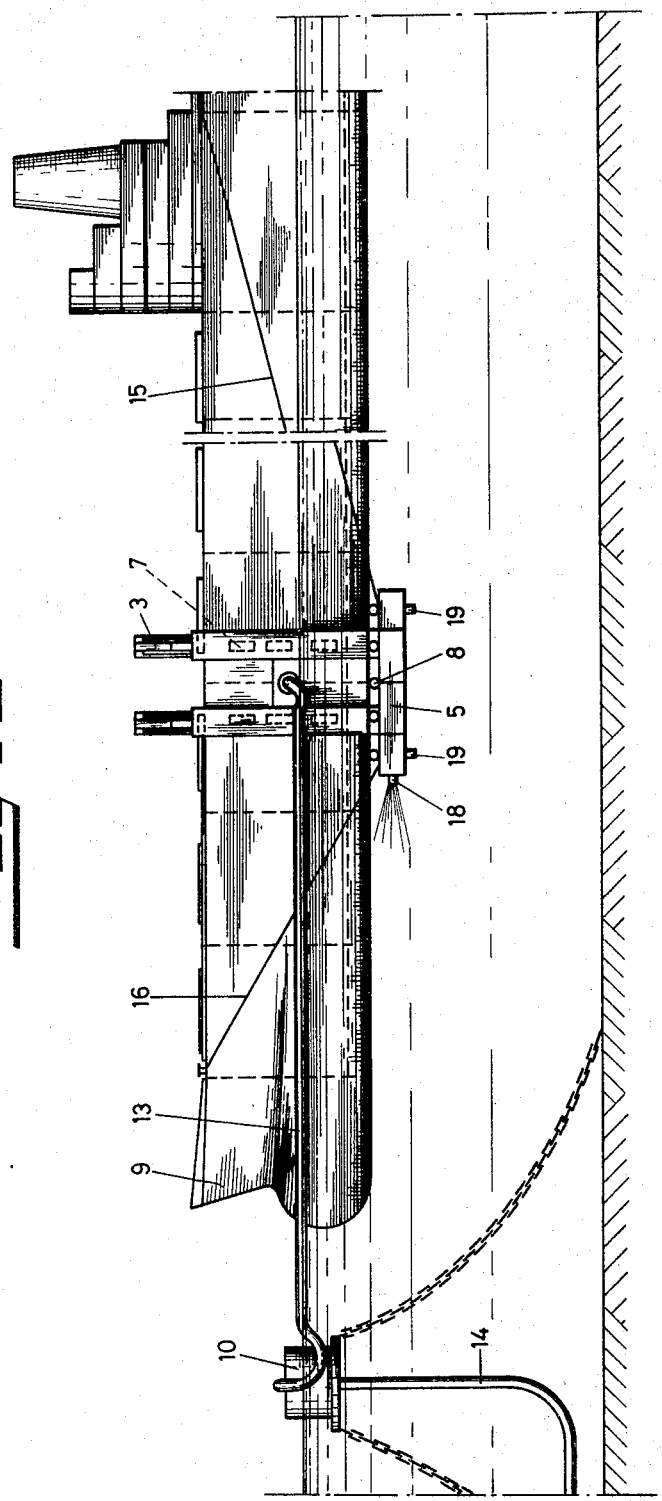

1

SHIP LOADING AND UNLOADING EQUIPMENT

The invention relates to loading and unloading equipment for vessels adapted to carry bulk materials, liquids or other materials to be loaded and unloaded in bulk, comprising a body with buoyancy, loading and unloading devices respectively, which are adapted to be positioned above and in the holds, or the tanks of a vessel, and means for shifting the installation alongside the vessel to be loaded or unloaded. Such loading and unloading devices are known in the art in various forms and usually comprise a pontoon, which is positioned alongside the vessel to be loaded or unloaded in order to transfer the bulk materials from one vessel to the other, e.g. from a sea-going vessel to a river-going vessel. When grain or a similar light material has to be dealt with use is made of so-called elevators which empties the hold of one vessel by sucking up the material, while loading the hold of the other vessel by blowing the material in the hold of said vessel.

For heavier materials, such as ores, often use is still made of dockside load handling installations. The cargo carrying capacity of vessels to be used for such bulk materials is continuously increasing, as does the capacity of oil tankers, so that they become less and less suitable to be moored at all the unloading stations.

It is an object of the present invention to provide an installation which is in principle suited, in dependance on the unloading and loading equipment available, to transfer any type of bulk material, but in particular suited for the transfer of bulk materials in less quiet waters, such as offshore locations, which materials are carried by so-called bulk-carriers, i.e. large vessels with a considerable cargo carrying capacity, which are moored to buoys, and by which installation unloading can be effected, similar to the situation prevalent with tankers. Where tankers are concerned supply and discharge lines extend via the buoy to a land storage tank, for example.

The contemplated object is achieved according to the invention by the fact that the installation has an adjustable buoyancy and is provided with a horizontally extending portion adapted to be positioned underneath the hull of a vessel. This makes it possible to realize a firm interconnection between the loading and unloading equipment and the vessel to be loaded or unloaded. By decreasing the buoyancy the installation is caused to adopt a position in which the horizontal portion can be positioned underneath the vessel to be loaded or unloaded; if thereupon the buoyancy is increased, the installation is pressed with its horizontal portion against the bottom of the hull so that it will follow the motions of the hull. To this end the horizontal portion itself is preferably provided with the requisite buoyancy chambers.

This principle is applicable to relatively small installations, e.g. for the transfer of grain, but it is also applicable to large installations for the transfer of ore and the like via a buoy to a land-side location, the material being subsequently transported with the aid of pumping means mounted in the loading and unloading installation via a discharge line extending through the buoy to a storage space on shore, the installation being furthermore provided with means for the supply of water with the aid of which the ore stored in the hold of the vessel can be loosened and rendered suitable to be pumped.

In accordance with the invention the installation itself can also be anchored as a buoy, while it may, if desired, be provided with a discharge line, which is connected to the installation via connecting means which is adapted to rotate about a vertical axis. For this purpose the installation according to the invention is provided with the requisite pumping means.

In accordance with the invention the horizontal portion and a vertical stand joined therewith of the installation may furthermore be provided with guide means, such as rollers by which a displacement alongside the vessel to be loaded or unloaded is promoted. The installation according to the invention during the loading or unloading process can be moved alongside the vessel without the interconnection obtained by the buoyancy being lost.

If necessary the horizontal portion can be provided with means for anchoring the end of said portion to the other side of the vessel to be loaded or unloaded.

The pressing action against the vessel and/or displacing of the installation can further be effected or promoted with the aid of ejecting nozzles.

For effecting these movements the vessel can usually supply sufficient power. It is to be understood that winches can also be utilized to move the installation.

It is furthermore feasible according to the invention to provide at the side of the vertical stand facing away from the horizontal portion an additional horizontal portion. In this instance the installation can handle two vessels at the same time, or it can transfer the cargo from one vessel into the other vessel. In this respect it may be advantageous to provide the said additional horizontal portion with means for the support of a vessel, such as a river-going vessel, which means are vertically adjustable.

The invention will now be elucidated further with reference to the drawings.

FIG. 1 shows a side elevational view of the installation in the transport position.

FIG. 2 shows the installation of FIG. 1 cooperating with a vessel to be loaded or unloaded.

FIG. 3 shows a lateral view of the installation shown in FIG. 2.

FIG. 4 shows a view similar to FIG. 2 of an alternative embodiment of the invention.

FIG. 5 shows a view similar to FIG. 1 of an embodiment in the form of a buoy.

The installation shown in FIG. 1 comprises an upwardly extending portion 1 having buoyancy chambers, not shown, an engine-room 2 and an extendable arm 3 with suction pipes 4, shown in folded position. The installation has a horizontal portion 5 with a number of buoyancy chambers and is provided with guide rollers 7 and 8 respectively on the vertical wall 6 and at the top of the horizontal portion 5.

FIGS. 2 and 3 show a bulk-carrier 9, which is anchored to a buoy 10.

The installation according to the invention is connected with the carrier 9 by initially reducing the buoyancy of said installation until the horizontal portion 5 can be positioned underneath the bottom of the carrier 9, whereupon the buoyancy is increased again resulting in the installation according to the invention being retained integrally firmly pressed against the bottom of the carrier 9.

In the position shown in the FIGS. 2 and 3, the arm 3 is in the extended position and the suction pipe 4 is unfolded so that it reaches inside the hold 11 of the carrier. At 12 is shown diagrammatically a nozzle of a pipe, not shown in the drawings, for the supply of water by which the contents of the hold can be rendered suitable to be pumped. The material loosened by the pumping action is transported through the suction pipe 4 and pumps, not shown in the drawings, to the pressure pipe 13 and via the buoy and the line 14 to a storage place, for instance, situated at the shore. For the purpose of pumping the mixture thus obtained and for the purpose of feeding the water for preparing said mixture pumps known as such can be mounted at positions known as such.

The installation, in the embodiment shown in the drawings, is furthermore connected with the ship's hull by hauling ropes 15, 16 and 17.

For the purpose of moving the installation there may furthermore be utilized nozzles 18, while the bottom part of the installation may be provided with nozzles 19, which are of particular significance for stabilizing the installation when the same has to be positioned underneath the hull and against the hull of the vessel to be loaded or unloaded, while the buoyancy is reduced.

The installation shown in FIG. 4 is partially similar to the one shown in FIG. 2 and therefore like elements are denoted by like reference numerals.

At the right-hand side of the upwardly directed portion 1 is a second horizontal portion 20, which is provided with supporting rollers 21 which are supported by vertically adjustable jacks 22. At 23 a river-going vessel is shown. At 24 horizontally adjustable guide members are mounted. Loading the vessel 23 occurs via the supply line 25.

FIG. 5 shows an installation similar to the one shown in FIG. 1, to which there has been added only a turning table 26, a discharge line 27 and anchor ropes or chains 28.

What we claim is:

1. Apparatus for transferring bulk materials to or from vessels, comprising an at least partially L-shaped buoyant body of variable buoyancy having an upright portion and a horizontally extending portion adapted to engage respectively with one side and the bottom of a said vessel, and material-handling means mounted on said upright portion to transfer bulk materials relative to the vessel, said body terminating laterally outwardly away from said upright portion in said horizontally extending portion and being open on the side opposite said upright portion whereby said body can move into material transfer position relative to said vessel by movement of said body laterally relative to the longitudinal axis of said vessel with said horizontally extending portion moving laterally of said vessel beneath said vessel and said upright portion moving laterally of said vessel into engagement with said one side of said vessel.

2. Apparatus as claimed in claim 1, and roller means on said body for facilitating movement of said body lengthwise of a said vessel.

3. Apparatus as claimed in claim 1, and means at the end of said horizontal portion remote from said upright portion for securing said end to the opposite side of a said vessel.

4. Apparatus as claimed in claim 1, and a further horizontal portion extending laterally away from said upright portion on the side of said upright portion opposite the first-mentioned horizontal portion.

5. Apparatus as claimed in claim 4, and vertically adjustable means on said further horizontal portion for supporting a further vessel.

6. Apparatus as claimed in claim 1, and anchor means for said body.

7. Apparatus as claimed in claim 1, and liquid ejecting nozzles on said body for moving said body relative to said vessel.

* * * * *